US010761203B2

United States Patent
Eriksson (10) Patent No.: US 10,761,203 B2
(45) Date of Patent: Sep. 1, 2020

(54) DECISION BASED RE-PROCESSING FRAMEWORK FOR RADAR TECHNOLOGY

(71) Applicant: SAAB AB, Linkoeping (SE)

(72) Inventor: Stefan Eriksson, Landvetter (SE)

(73) Assignee: SAAB AB, Linkoping (SE)

( * ) Notice: Subject to any disclaimer, the term of this patent is extended or adjusted under 35 U.S.C. 154(b) by 0 days.

(21) Appl. No.: 16/495,537

(22) PCT Filed: Mar. 22, 2017

(86) PCT No.: PCT/SE2017/050278
§ 371 (c)(1),
(2) Date: Sep. 19, 2019

(87) PCT Pub. No.: WO2018/174757
PCT Pub. Date: Sep. 27, 2018

(65) Prior Publication Data
US 2020/0064460 A1    Feb. 27, 2020

(51) Int. Cl.
*G01S 13/58* (2006.01)
*G06F 17/18* (2006.01)

(52) U.S. Cl.
CPC ............ *G01S 13/584* (2013.01); *G06F 17/18* (2013.01)

(58) Field of Classification Search
CPC ........ G01S 13/28; G01S 13/52; G01S 13/582; G01S 7/292; G01S 7/2923; G01S 7/414;
(Continued)

(56) References Cited

U.S. PATENT DOCUMENTS

2012/0306684 A1\* 12/2012 Shoji .................... G01S 13/582
342/107
2016/0371849 A1    12/2016 Pavek et al.

OTHER PUBLICATIONS

Kashin et al., "Target Velocity Estimation in OFDM Radar Based on Subspace Approaches," 2013 14th International Radar Symposium (IRS), Dresden, Jun. 19, 2013, vol. 2, pp. 1061-1066. [Retrieved from the Internet Sep. 17, 2019] <https://ieeexplore.ieee.org/abstract/document/6581722>.
(Continued)

*Primary Examiner* — Timothy A Brainard
(74) *Attorney, Agent, or Firm* — Alston & Bird LLP (57) ABSTRACT

The present disclosure relates to a method for signal processing resource allocation. The method comprises receiving (S10) streaming signal data. The method further comprises, at a first computational resource, determining (S20) a first data subset of the streaming signal data based on a selection criterion, the selection criterion having a contextual relationship with a predetermined scenario. The method also comprises determining (S25) a second data subset of the received streaming signal data based on the first data subset and the contextual relationship. The method additionally comprises, at a second computational resource, analysing (S30) the second data subset using an algorithm based on the contextual relationship. The method further comprises forming (S40) aggregated signal data based on the received streaming signal data and the analysed second data subset. The method yet further comprises outputting (S50) data based on the aggregated signal data. The present disclosure also relates to corresponding systems and computer programs.

17 Claims, 4 Drawing Sheets

(58) Field of Classification Search
CPC .. G06K 9/3233; G06K 9/6201; G06K 9/6267; G06T 2207/10044; G06T 7/20; G06T 7/277; G06T 7/0024
USPC ........................................................ 342/107
See application file for complete search history.

(56) References Cited

OTHER PUBLICATIONS

International Searching Authority, International Search Report and Written Opinion for International Application No. PCT/SE2017/050278, dated Sep. 19, 2017, (10 pages), Sweden.

* cited by examiner

DECISION BASED RE-PROCESSING FRAMEWORK FOR RADAR TECHNOLOGY

CROSS REFERENCE TO RELATED APPLICATIONS

This application is a National Stage Application, filed under 35 U.S.C. 371, of International Application No. PCT/SE2017/050278, filed Mar. 22, 2017, the contents of which are hereby incorporated by reference in their entirety.

BACKGROUND

Related Field

The present disclosure relates to signal processing. More specifically, the present disclosure relates to improved signal processing performance for real time analysis of high signal loads and limited signal processing resources.

Description of Related Art

During real time use of radar technology, vast amounts of signal data typically need to be processed. However, the computational resources needed to perform the desired high performance signal processing functions are typically expensive, and often require dedicated environments and considerable power during operational use. It is therefore common that the computational resources available to perform signal processing are limited and possibly not sufficient to perform real time analysis of the signal data using the desired signal processing high performance algorithms. In practice, variations of data stream mining are typically employed, where the signal data processed using a simplified version of the desired high performance algorithm. There is thus a need in the art for means for efficient signal data processing for data-intensive streaming signal data.

BRIEF SUMMARY

The present disclosure relates to a method for signal processing resource allocation. The method comprises receiving streaming signal data. The method further comprises, at a first computational resource, determining a first data subset of the streaming signal data based on a selection criterion, the selection criterion having a contextual relationship with a predetermined scenario. The method also comprises determining a second data subset of the received streaming signal data based on the first data subset and the contextual relationship. The method additionally comprises, at a second computational resource, analysing the second data subset using an algorithm based on the contextual relationship. The method yet further comprises forming aggregated signal data based on the received streaming signal data and the analysed second data subset. The method also comprises outputting data based on the aggregated signal data By adapting the disclosed method resources may be shared adaptively by allocating the available processing resources in a way such that a basic processing load is applied for the main, i.e. bulk, data and a high performance resource requiring high performance algorithms is applied only on the data for which it is required. The contextual relationship enables establishing a connection between determining characteristics of the streaming signal data and further analysis of subsets of the streaming signal data. The contextual relationship determines which algorithms to use and which subsets to analyze further.

According to some aspects, the predetermined scenario comprises a radar detection scenario. Radar detection is field typically involving high load streaming of radar signal data with only limited computational resources available to analyse the streaming radar signal data. By employing the disclosed method and arranging the predetermined scenario to comprise a radar detection scenario, the computational resources are focused to only perform detailed analysis of data relevant within the context of the radar detection scenario. Examples of radar detection scenarios include detecting, identifying and/or tracking objects. The efficiency and flexibility of the model arises as a synergetic effect between the division of the computational resources and the contextual relationship established between the algorithms used to extract and analyse signal data and the scenario to which the algorithms relate. For instance, within the context of detecting objects, a signal-to-noise criterion may be used as selection criterion. A simple signal-to-noise threshold to determine the first subset may be implemented at the first computational resource, while a more computationally demanding low loss signal processing algorithm may be implemented at the second computational resource.

According to some aspects, the method further comprises storing the signal data on a data storage device. According to some further aspects, analysing the second data subset further comprises obtaining the second data subset from the data storage device. The use of a storage device extends the possible algorithms and time windows available for use when analysing the signal data. Storing the streaming signal data enables retrieval of the data at times much later than a characteristic time of the streaming signal data. Old data may thus be revisited as many times as desired and previous output may be amended as new data becomes available by reanalysing the old data in light of the new data.

According to some aspects, the second data subset is equal to the first data subset. This enables a more thorough analysis of the data corresponding to the first data subset. Further, it potentially reduces the amount of data needed to be transferred directly between the first computational resource and the aggregating module of the corresponding system.

According to some aspects, the algorithm based on the contextual relationship comprises at least one of a track before detect algorithm, a low loss signal processing algorithm, a high accuracy position, velocity estimation algorithm, and an advanced object feature estimation algorithm. The contextual relationship establishes which subset of the streaming signal data that shall be analysed further, as well as which algorithm to be used to perform the analysis. This enables a more detailed analysis of the second data subset. By basing the algorithm on the contextual relationship, a trade-off between a computationally efficient algorithm at the first computational resource and a corresponding high performance algorithm at the second computational resource can be arranged.

According to some aspects, determining the first data subset comprises using an algorithm arranged to require less computational resources than the algorithm used to analyse the second data subset. The use of a more computationally efficient algorithm than the algorithm used to analyse the second subset for analysing the streaming signal data provides an efficient and adaptable use of the available computational resources. The first resource can thereby be used to effectively scan all of the streaming signal data while the second computational resource may be used to perform further analysis of the identified first subset and/or related data as needed.

According to some aspects, the selection criterion comprises an indication of at least one of a signal-to-noise ratio, a model parameter estimation and a feature estimation. Examples of indication are a signal-to-noise ratio exceeding a predetermined threshold, a model parameter, e.g. position and/or velocity, indicating the detection and/or behaviour of an object, or a feature indicating a certain type of object. In other words, the indication of the selection criterion establishes a contextual relationship with a predetermined scenario. The selection criterion thereby provides an effective means of identifying a relevant first data subset, while also providing information enabling the second computational resource to use an appropriate algorithm suitable for analysis of the corresponding second data subset.

According to some aspects, aggregating the signal data and the data set comprises updating previously output data based on the analysed second data subset. Previous output may thereby be amended by means of data aggregation as new information becomes available.

The present disclosure also relates to corresponding systems and computer programs having all the technical effects and advantages of the disclosed method.

DETAILED DESCRIPTION OF VARIOUS EMBODIMENTS

Figure 1:
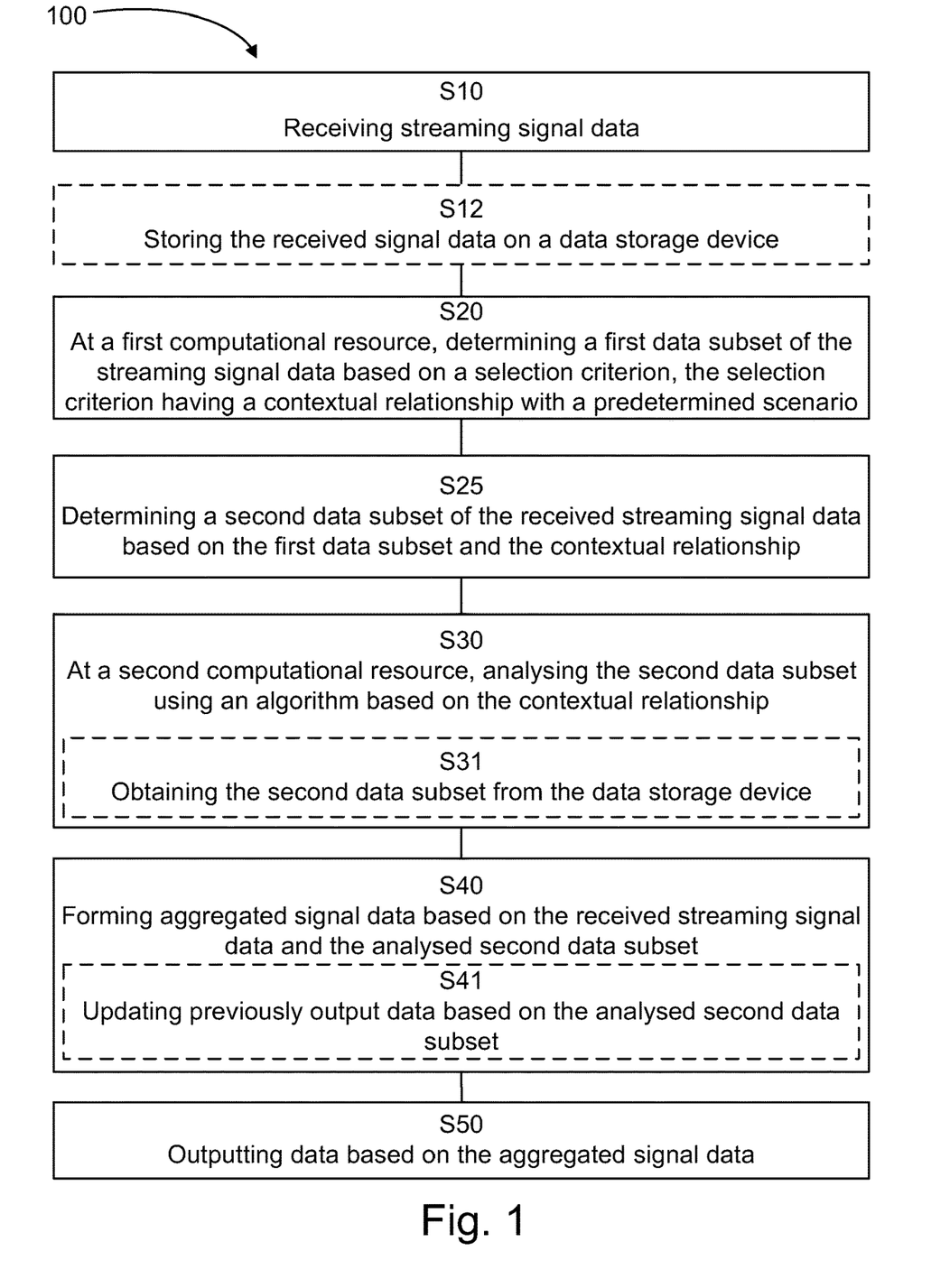
FIG. 1 is a flow chart illustrating method steps of the method for signal processing resource allocation.

FIG. 1 is a flow chart illustrating method steps of a method 100 for signal processing resource allocation, e.g. radar signal processing resource allocation. The method is based on the realisation that the available computational resources may be partitioned into a first computational resource dedicated to scan the streaming signal data, e.g. streaming radar signal data, using an algorithm suitable for high signal throughput processing, and a second computational resource dedicated to process a subset of interest identified by the first computational resource using an algorithm suitable for high performance signal processing. In other words, the first computational resource provides a preliminary result, which may trigger, possibly at some future point in time, a need for further analysis by the second computational resource. In addition to enabling the use of high performance algorithms to process relevant subsets of the signal data stream, the partitioning of the computational resources have additional synergistic effects in that computational resources may be shared adaptively and in that the signal data processing may be enhanced with respect to both adaptability and performance, as will be illustrated further below. An important point of the inventive concept is that it is possible to amend the output, i.e. the reported results, including previously reported results, by means of data aggregation as new information becomes available, e.g. functions are being updated or refined. The track and detect algorithm discussed above and below is one such example.

The method comprises receiving SW streaming signal data. According to some aspects, the streaming signal data relates to signals received by one or more radars, i.e. streaming radar signal data. According to some aspects, the predetermined scenario comprises a radar detection scenario. The radar detection scenario provides a context which may be used as a basis for how to divide the computational resources available and which algorithms and selection criterion to use when analysing the streaming signal data.

According to some aspects, the method comprises storing S12 the received signal data on a data storage device. Storing the signal data on a data storage device enables retrieval of signal data for further analysis. The retrieval of signal data may be combined with different choices of signal processing algorithms and/or the study of signal data over different time intervals in a manner that may be used synergistically when analysing the streaming signal data and subsequently aggregating the results of processed signal data, as will be illustrated further below. In particular, having access to stored data enables retrieval of data having been processed by the first computational resource at a time long after the characteristic time scale at which the streaming signal data is streamed. The stored data may also be analysed a plurality of times, possibly by different algorithms.

The method further comprises determining S20 a first data subset of the streaming signal data based on a selection criterion at a first computational resource. The selection criterion has a contextual relationship with a predetermined scenario. The first computational resource is preferably implemented for high throughput signal processing, i.e. it is arranged as a limited computational resource allocation arranged to perform real-time high load signal processing algorithms on the streaming signal data. Since the first computational resource typically won't be able to do a thorough analysis of the data-intensive streaming signal data, it is arranged to determine subsets of the signal data to be analysed further by a second computational resource arranged to perform high performance signal processing, i.e. the second computational resource may have more powerful computational resources than the first computational resource and will have high performance algorithms for analysing the subsets further.

According to some aspects, the predetermined scenario comprises a radar detection scenario. Radar detection is field typically involving high load streaming of radar signal data with only limited computational resources available to analyse the streaming radar signal data. By employing the disclosed method and arranging the predetermined scenario to comprise a radar detection scenario, the computational resources are focused to only perform detailed analysis of data relevant within the context of the radar detection scenario. Examples of radar detection scenarios include detecting, identifying and/or tracking objects. The efficiency and flexibility of the model arises as a synergetic effect between the division of the computational resources and the contextual relationship established between the algorithms used to extract and analyse signal data and the scenario to which the algorithms relate. For instance, within the context of detecting objects, a signal-to-noise criterion may be used as selection criterion. A simple signal-to-noise threshold to determine the first subset may be implemented at the first computational resource, while a more computationally demanding low loss signal processing algorithm may be implemented at the second computational resource. In other words, the algorithm at the first computational resource requires less computational resources than the algorithm at the second computational resource.

The selection criterion determines which subsets of the streaming signal data that are processed further by the second computational resource. The selection criterion depends on the algorithm used by the first computational resource to perform the simplified analysis of the whole signal data stream. The selection criterion is related to the algorithm used by the first computational resource via the contextual relationship. For instance, if the contextual relationship relates to a model for determining position and velocity of objects, the model may be implemented as an algorithm used by the first computational resource and the selection criterion may relate to estimate certainties of model parameter estimates. The algorithm used at the first computational resource is preferably a simplified version of a corresponding more advanced and more computationally demanding algorithm at the second computational resource. In other words, the selection criterion is arranged to enable the algorithm used by the first computational resource to determine features in the streaming signal data corresponding to subsets of signal data suitable for further analysis by an algorithm at the second computational resource. For instance, the algorithm based on the contextual relationship used by the second computational resource may comprise at least one of a track before detect algorithm, a low loss signal processing algorithm, a high accuracy position, velocity estimation algorithm, and an advanced object feature estimation algorithm. The first computational resource is then preferably arranged to use a set of corresponding algorithms that are arranged to be computationally efficient and enable determination of subsets suitable for further analysis at the second computational resource by the more advanced version of the algorithm at the first computational resource.

According to some aspects, the selection criterion comprises identification of a set of features within a time window of the streaming signal data. The set of features may be identified with a particular high performance algorithm of the second computational resource in mind, i.e. the identification of the set of features is arranged to identify a set of features correlating with data for which the high performance algorithm is particularly suited to analyse. For instance, the set of features may comprise a set of amplitudes within a time-window above a predetermined threshold. This could be implemented, e.g., using a simple filter to determine if there are signal components, i.e. subsets of the signal data, which have amplitudes above a predetermined threshold. Alternatively, or in combination to identifying amplitudes above a predetermined threshold, amplitudes above another predetermined threshold may also be used as a criterion.

According to some aspects, the algorithm used at the first computational resource is based on estimating parameters of a model. The selection criterion may then be based on an indication based on the estimated parameters. For instance, the estimated model parameters indicate a set of features typically associated with real life objects, e.g. a particular type of aircraft or missile, or real life scenarios, e.g. coordinated movement by a plurality of detected objects. The estimated model parameters may instead or in addition thereto indicate a trajectory of an object, thereby triggering a need for the second computational resource to further analyse the origin of the object and/or provide more accurate estimates of the present and/or future trajectory.

According to some aspects, the selection criterion is based on temporal characteristics of the streaming data, e.g., peaks appearing at certain intervals, grouping of peaks or time-dependence of the amplitudes of certain peaks.

The selection criterion may also depend on the physical hardware used to implement the first computational resource. For instance, the first computational resource may comprise an analogue signal filter arranged to implement an algorithm arranged to determine the first data subset based on the selection criterion.

To sum up, according to some aspects the first data subset is determined based on an algorithm arranged to require less computational resources than the algorithm used to analyse the second data subset. The selection criterion may comprise an indication of at least one of a signal-to-noise ratio, a model parameter estimation and a feature estimation.

The method further comprises determining S25 a second data subset of the received streaming signal data based on the first data subset and the contextual relationship. The second data subset is preferably determined at the first computational resource. The second data subset may also be determined at a dedicated subset determination module. According to some further aspects, the first computational resource comprises the subset determination module. The method yet further comprises, analysing S30 the second data subset using an algorithm based on the contextual relationship at a second computational resource. According to some aspects, the second data subset is determined at the second computational resource prior to analysing the second data subset. As stated above, and illustrated further below, the contextual relationship establishes a relation between the selection criterion and the algorithms used at the first and second computational resources. The selection criterion comprises the criterion used by the algorithms of the first computational resource to determine the first data subset. Using an algorithm based on the contextual relationship, e.g. via the selection criterion, at the second computational resource ensures that the algorithm used matches the objectives for which the method is implemented. In particular, because the contextual relationship often determines that the algorithms at the first and second computational resource shall relate to the same computational problem, albeit at different computational complexity, the selection criterion typically corresponds to the use of a particular algorithm at the first computational resource. Basing the algorithm used at the second computational resource on also the selection criterion enables a more advanced and potentially more powerful algorithm matching the algorithm used at the first computational resource to be selected. Since the algorithm used at the first computational resource was arranged to provide certain functionality, the matching of a similar but more powerful algorithm at the second computational resource increases the probability that the algorithm at the second computational resource will be able to provide enhanced corresponding functionality.

The second data subset may be chosen based on e.g. an integrated signal-to-noise ratio, SNR, maximization at the first computational resource indicating a subset of the streaming signal data. The indicated subset thus serves as the first subset of the streaming signal data. For instance, the algorithm at the first computational resource may be arranged to use a simplified track-and-detect algorithm comprising integrating signal data over time before declaring a target. Depending on what the main focus of the analysis of the second data set is, the second data subset may be equal to the first data subset, comprise a subset of the first data subset, comprise the first data subset and a third data subset of the streaming signal data not overlapping with the first data subset, or only the third data subset. Different scenarios relating to the choice of the second data subset will be described further below.

According to some aspects, the second data subset is equal to the first data subset. This is typically implemented if an aspect of the first data subset needs to be analysed in greater detail. For instance, the first data subset may be an indication of an object having a particular position and velocity. The first data subset is then taken as the second data subset and analysed at the second computational resource by a high accuracy position and velocity estimation algorithm. Another example includes the first subset indicating a particular object feature, e.g. an indication of a man-made object in natural terrain. The first data subset is then taken as the second data subset and analysed at the second computational resource by an advanced object feature estimation algorithm.

According to some aspects, the second data set is taken as a subset of the first data subset. This is very useful if one wishes to focus the second computational resource on e.g. a specific feature or a specific parameter in a model from a set of possible features or parameters. Important information may be thereby be extracted from the first data subset without having to examine the whole of the first data subset, which reduces the computational need and thus reduces the load of the second computational resource. For instance, the computational complexity of identifying scale-invariant feature transform, SIFT, features often scales quadratically with the video resolution, which means that any reduction in the subset of interest can have profound impact on computational performance.

According to some aspects, the second data subset comprises the first data subset and a third data subset of the streaming signal data not overlapping with the first data subset. In other words, the second data subset is an extension of the first data subset. The additional data points enable the algorithm of the second computational resource to improve the accuracy and the level of detail of the estimation performed by the algorithm. The third data subset may be determined based on the contextual relationship. For instance, if the contextual relationship is based on tracking objects by radar, the third data set may comprise data points where a tracked object may have originated from.

According to some aspects, the second data subset comprises only the third data subset. This is very useful for deriving conclusions from the streaming signal data when a very high precision is required. According to some aspects, the third subset is a subset of the first data set. For instance, the third data set may be focused on processing a particular feature from a set of identified features with very high resolution. The third data set may also focus on a single peak in a set of peaks. In other words, according to some aspects, the algorithm based on the selection criterion comprises at least one of a track before detect algorithm, a low loss signal processing algorithm, a high accuracy position, velocity estimation algorithm, and an advanced object feature estimation algorithm.

Several of the above aspects require data extending beyond the first subset to be used in the second subset. Furthermore, data-intensive streaming data systems, e.g. conventional systems for analysing streaming radar signal data, are often arranged to discard the data once the data has been processed by a computational resource corresponding to a first computational resource according to the present disclosure. Also, when determining the second data subset, it may be of interest to include data from a point in time which was relatively far back in time considering a current moment and the time scale at which the streaming signal data is processed, e.g. seconds to hours compared to microseconds. In all these cases, a mechanism for obtaining the desired data for the second data subset is needed. Therefore, according to some aspects, analysing S30 the second data subset further comprises obtaining S31 the second data subset from the data storage device. In other words, the system which executes the method comprises a storage device arranged store the received signal data and to provide stored signal data to the second computational resource.

The method further comprises forming S40 aggregated signal data based on the received streaming signal data and the analysed second data subset. The aggregated signal data is preferably arranged to facilitate the generation of output arranged to provide a user with an interpretation of the analysed second data subset. As stated above, the step of forming S40 aggregated signal data may comprise amending previously reported output as new information becomes available. In other words, according to some aspects, forming S40 aggregated signal data comprises updating S41 previously output data based on the analysed second data subset.

The method also comprises outputting S50 data based on the aggregated signal data and the data set based on the analysed second data subset.

Figure 2:
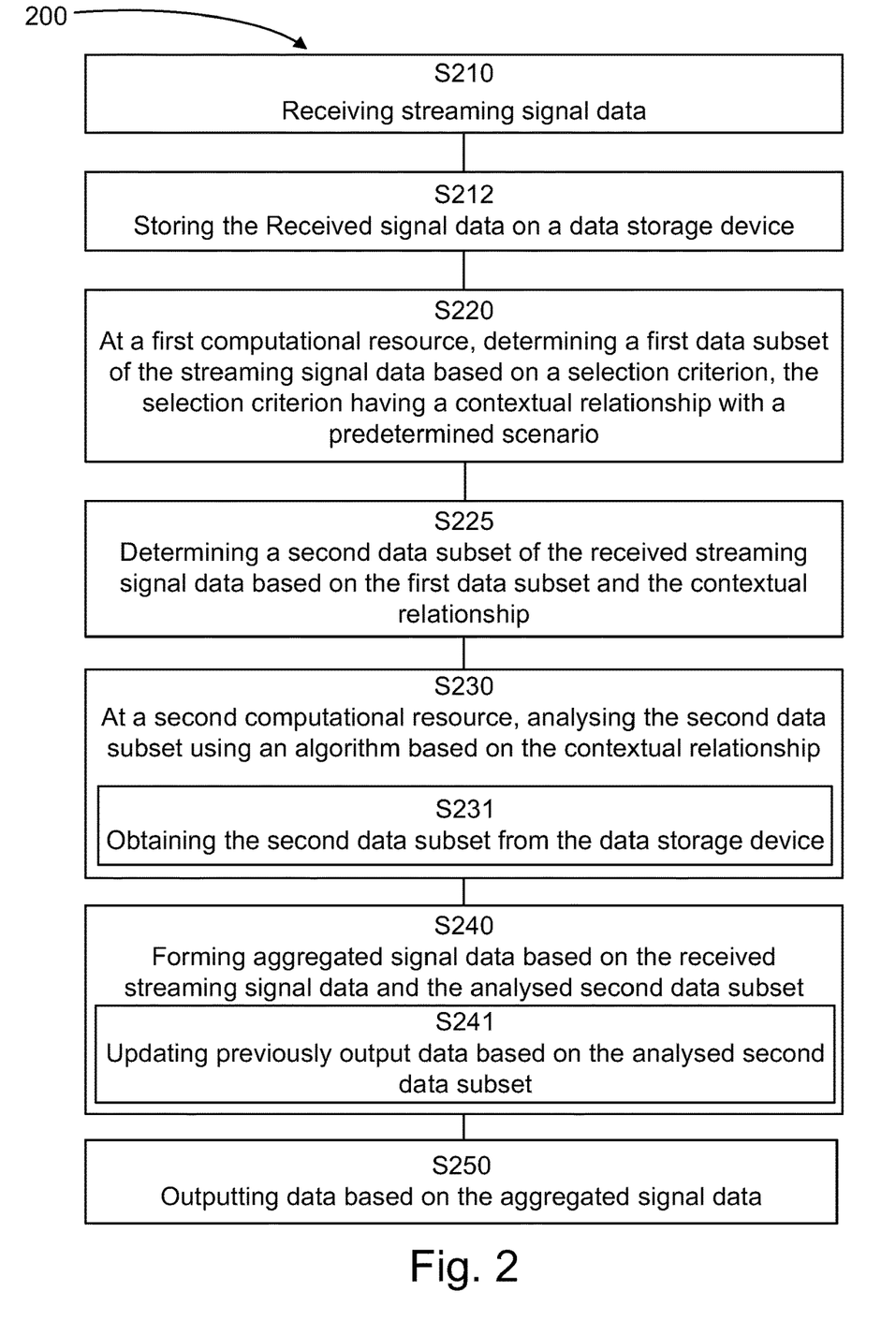
FIG. 2 is a flow chart illustrating method steps of the method for signal processing resource allocation.

FIG. 2a is a flow chart illustrating a preferred embodiment of the method for signal processing resource allocation. The method 200 comprises receiving S210 streaming signal data. According to some aspects, the streaming signal data comprises radar data. The method comprises storing S212 the received signal data on a storage device. The method further comprises determining S220 a first data subset of the streaming signal data based on a selection criterion at a first computational resource. The selection criterion has a contextual relationship with a predetermined scenario. The predetermined scenario preferably comprises a radar detection scenario. The method 200 further comprises determining S225 a second data subset of the received streaming signal data based on the first data subset and the contextual relationship. The second data subset is preferably determined at the first computational resource. According to some aspects, the first data subset is determined based on an algorithm arranged to require less computational resources than the algorithm used to analyse the second data subset. In other words, the algorithm is arranged to perform a minimal set of computational operations and/or perform computational operations optimized for fast execution. For instance, the algorithm may be an implementation of first model, wherein the first model a simplified version of a second model. According to some further aspects, the implementation of the first model comprises estimating a set of parameters of the first model. The algorithm may also be arranged to perform an integration of a signal-to-noise ratio, SNR. According to some aspects, the algorithm is arranged to estimate a first set of features. The first set of features are arranged to approximate a second set of features having higher resolution than the first set of features. In other words, the selection criterion comprises an indication of at least one of a signal-to-noise ratio, a model parameter estimation and a feature estimation.

The method also comprises analysing S230 the second data subset using an algorithm based on the contextual relationship at a second computational resource. Analysing S230 the second data subset further comprises obtaining S231 the second data subset from the data storage device. Obtaining the second data subset from the data storage device greatly increases the range of possible timeframes which may be analysed in response to the selection criterion indicating a need for further analysis, as has been described above in relation to FIG. 1. According to some aspects, the algorithm based on the selection criterion comprises at least one of a track before detect algorithm, a low loss signal processing algorithm, a high accuracy position, velocity estimation algorithm, and an advanced object feature estimation algorithm. According to a preferred aspect, the algorithm based on the selection criterion is a more advanced version of an algorithm used in the step of determining the first data subset. Therefore, according to some aspects, the second data subset is equal to the first data subset.

The method additionally comprises forming S240 aggregated signal data based on the received streaming data and the analysed second data subset. Forming S240 aggregated signal data comprises updating S241 previously output data based on the analysed second data subset.

The method yet further comprises outputting S250 data based on the aggregated signal data.

All the possible aspects and the respective technical effects of the selection criterion and the method steps discussed in FIG. 1 also applies to the method disclosed in relation to FIG. 2.

Figure 3:
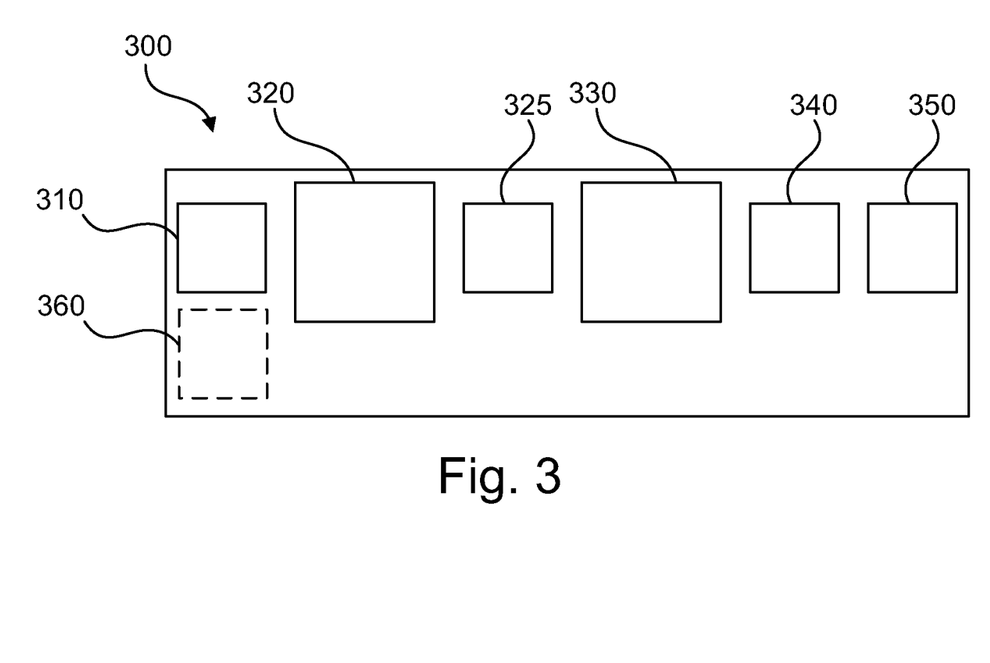
FIG. 3 is a block diagram illustrating a system for signal processing resource allocation.

FIG. 3 is a block diagram illustrating a system 300 for signal processing resource allocation. The system 300 comprises a streaming signal data receive module 310 arranged to receive streaming signal data. The streaming signal data may comprise radar data. The system further comprises a first computational resource 320 arranged to determine a first data subset of the streaming signal data based on a selection criterion. The selection criterion has a contextual relationship with a predetermined scenario. According to some aspects, the predetermined scenario comprises a radar detection scenario. The first computational resource 320 is preferably arranged as a high throughput signal processing resource. In other words, the first computational resource is preferably arranged to perform a cursory analysis of the streaming signal data in order to identify subsets that may require further analysis by a high performance signal processing unit. The selection criterion may be a selection criterion as described above in relation to FIGS. 1 and 2.

Thus the system also comprises a subset determination module 325 arranged to determine a second data subset of the received streaming signal data based on the first data subset and the contextual relationship. The system further comprises a second computational resource 330 arranged to analyse the second data subset using an algorithm based on the contextual relationship. The second computational resource 330 is preferably arranged as a high performance signal processing unit. In other words, the second computational unit 330 is preferable arranged to perform data-intensive analysis of a subset of the streaming signal data.

The system additionally comprises an aggregation module 340 arranged to form aggregated signal data based on the received streaming signal data and the analysed second data subset. The system yet further comprises an output module 350 arranged to output data based on the aggregated signal data. According to some aspects, the system comprises a storage device 360 arranged store the received signal data and to provide stored signal data to the second computational resource. The storage device 360 may be arranged to provide the stored signal data either via push or a pull mechanism. The storage device 360 is preferably arranged to receive the streaming data signal before or during the streaming data signal is processed by the first computational resource in order to determine the first data subset.

The streaming signal data receive module, the first computational resource, the subset determination module, the second computational resource, the aggregation module and the output module may be implemented as separate units arranged to communicate wirelessly or by wire, or a combination thereof. One or more of the streaming signal data receive module, the first computational resource, the subset determination module, the second computational resource, the aggregation module and the output module may be implemented as one or more integrated units.

Figure 4A:
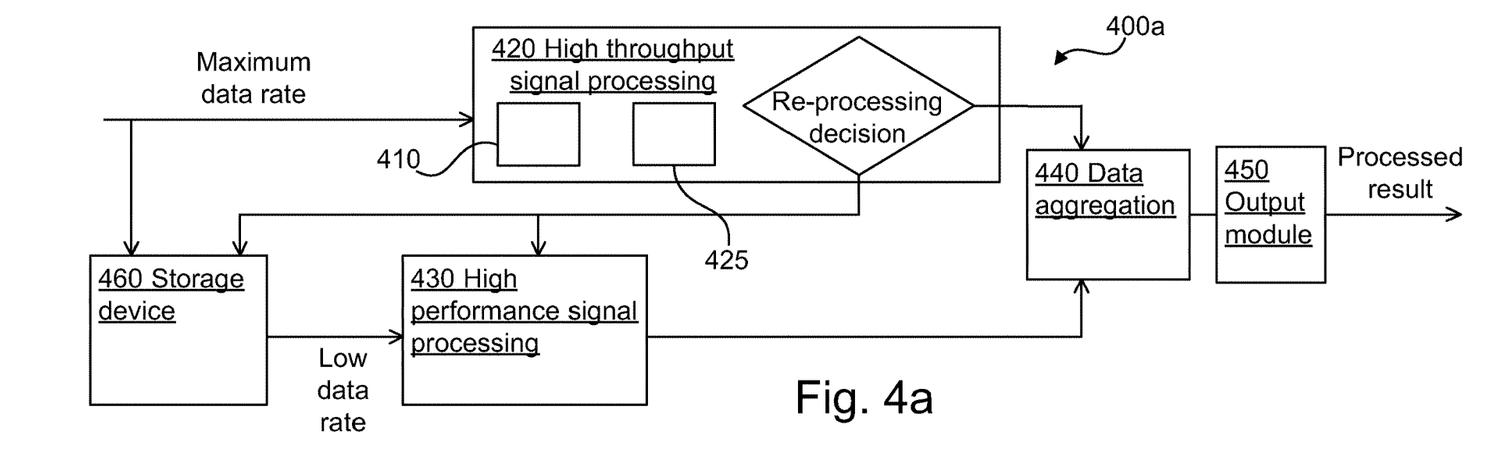
FIGS. 4a and 4b are block diagrams illustrating systems for signal processing resource allocation.
Figure 4B:
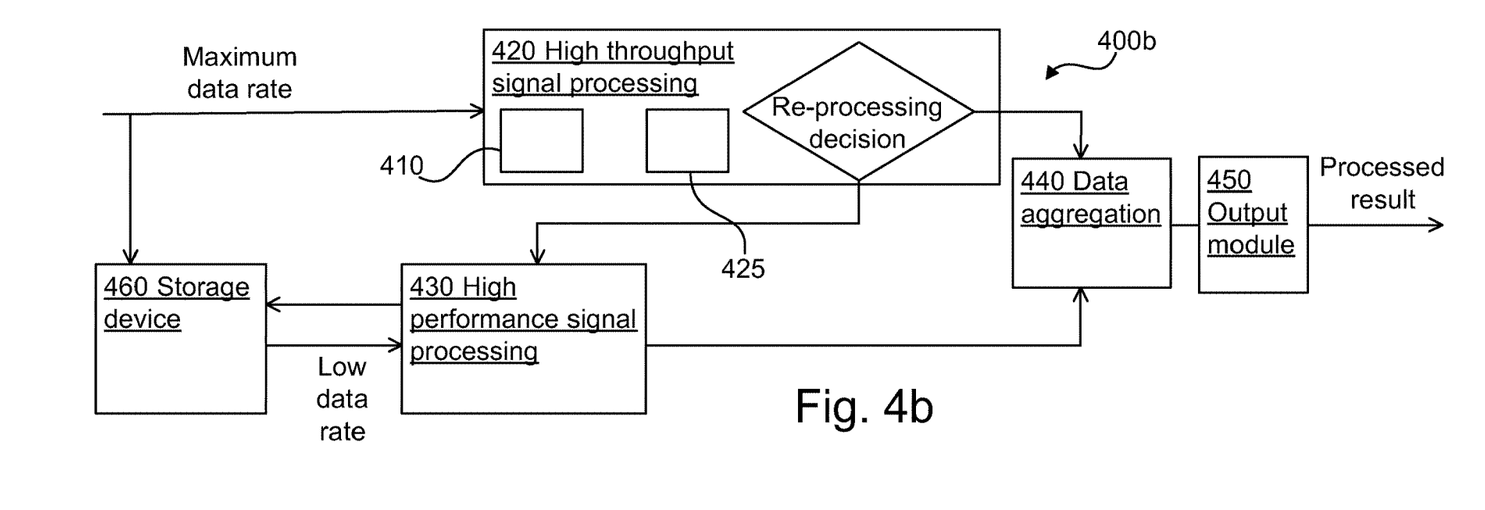

FIGS. 4a and 4b are block diagrams illustrating preferred embodiments of the disclosed system. The blocks are supplemented by arrows indicating how the respective system is arranged to transport information. The system 400a is arranged to receive streaming signal at a streaming signal data receive module 410 arranged to receive streaming signal data. The streaming signal data receive module 410 is arranged to receive the streaming signal data at a maximum data rate of the streaming signal data. The streaming signal data may comprise radar data. The system 400a further comprises a storage device 460 arranged store the received signal data. The storage device 460 is arranged to store a copy of the received signal data before or during the streaming signal data receive module 410 receives the streaming signal data. The storage device 460 is further arranged to receive a control signal arranged to determine a data subset and transmit the data subset based on the control signal. The system 400a further comprises a first computational resource 420 arranged to determine a first data subset of the streaming signal data based on a selection criterion. The selection criterion has a contextual relationship with a predetermined scenario. According to some aspects, the predetermined scenario comprises a radar detection scenario. The first computational resource is arranged to perform high throughput signal processing of the streaming signal data. The system further comprises a subset determination module 325 arranged to determine a second data subset of the streaming signal data based on the first data subset and the contextual relationship. The system 400a also comprises a second computational resource 430 arranged to analyse a second data subset using an algorithm based on the contextual relationship. The second computational resource 430 is arranged to perform high performance signal processing of the second data subset.

The first computational resource is arranged to transmit information relating to the first data subset and the contextual relationship, e.g. the selection criterion and/or the algorithm used at the first computational resource, to the second computational resource 430. The information transmitted from the first computational resource 420 to the second computational resource 430 enables the second computational resource to identify the second data subset and to decide on which algorithm to use in order to analyse the second data subset.

The first computational resource is further arranged to transmit a control signal to the storage device 460 arranged to cause the storage device 460 to transmit the second data subset to the second computational resource 430.

The system 400a further comprises an aggregation module 440 arranged to form aggregated signal data based on the received streaming signal data and the analysed second data subset. The first computational resource is arranged to transmit the processed streaming signal data to the aggregation module 440. According to some aspects, the first subset is excluded from the processed streaming signal data transmitted to the aggregation module. This reduces the amount of data needed to be transferred and may be used if the gaps can be filled by data from the second computational resource, e.g. when the second data set equals the first data set. The second computational resource is arranged to transmit data relating to the analysed second data subset to the aggregation module. The relating to the analysed second data subset comprises data arranged to provide a user with information suitable for presentation for a human observer. The information may comprise information arranged to provide a graphical representation of an object on a radar screen and/or information relating to properties of an object detected by radar.

The system 400*a* further comprises an output module 450 arranged to output data based on the aggregated signal data. The output may be arranged to amend previous output data, thereby updating previous output as new information becomes available.

FIG. 4*b* is identical to the system of FIG. 4*a* except that the second computational resource is arranged to transmit a control signal to the storage device 460 arranged to cause the storage device 460 to transmit the second data subset to the second computational resource 430 based on the information relating to the first data subset and the selection criterion transmitted to the second computational resource 430. In other words, FIG. 4*a* illustrates an embodiment where data is pushed from the storage device 460 to the second computational resource 430 and FIG. 4*b* illustrates an embodiment where data is pulled from the storage device 460 to the second computational resource 430.

The present disclosure also relates to computer programs comprising computer program code which, when executed, causes a system as disclosed above and below to carry out the method as illustrated above and below.

The invention claimed is:

1. A method (100; 200) for signal processing resource allocation, the method comprising:
    receiving (S10; S210) streaming signal data,
    at a first computational resource, determining (S20; S220) a first data subset of the streaming signal data based on a selection criterion, the selection criterion having a contextual relationship with a predetermined scenario,
    determining (S25; S225) a second data subset of the received streaming signal data based on the first data subset and the contextual relationship,
    at a second computational resource, analysing (S30; S230) the second data subset using an algorithm based on the contextual relationship,
    forming (S40; S240) aggregated signal data based on the received streaming signal data and the analysed second data subset, and
    outputting (S50; S250) data based on the aggregated signal data.

2. The method according to claim 1, wherein the predetermined scenario comprises a radar detection scenario.

3. The method according to claim 1, further comprising:
    storing (S12; S212) the received signal data on a data storage device.

4. The method according to claim 3, wherein analysing (S30) the second data subset further comprises:
    obtaining (S31; S231) the second data subset from the data storage device.

5. The method according to claim 1, wherein the second data subset is equal to the first data subset.

6. The method according to claim 1, wherein the algorithm based on the contextual relationship comprises at least one of
    a track before detect algorithm,
    a low loss signal processing algorithm,
    a high accuracy position, velocity estimation algorithm, and
    an advanced object feature estimation algorithm.

7. The method according to claim 1, wherein the first data subset is determined based on an algorithm arranged to require less computational resources than the algorithm used to analyse the second data subset.

8. The method according to claim 1, wherein the selection criterion comprises an indication of at least one of a signal-to-noise ratio, a model parameter estimation and a feature estimation.

9. The method according to claim 1, wherein forming (S40; S240) aggregated signal data comprises updating (S41; S241) previously output data based on the analysed second data subset.

10. A system (300; 400*a*, 400*b*) for signal processing resource allocation, the system comprising
    a streaming signal data receive module (310; 410) arranged to receive streaming signal data;
    a first computational resource (320; 420) arranged to determine a first data subset of the streaming signal data based on a selection criterion, the selection criterion having a contextual relationship with a predetermined scenario;
    a subset determination module (325; 425) arranged to determine a second data subset of the received streaming signal data based on the first data subset and the contextual relationship;
    a second computational resource (330; 430) arranged to analyse the second data subset using an algorithm based on the contextual relationship;
    an aggregation module (340; 440) arranged to form aggregated signal data based on the received streaming signal data and the analysed second data subset; and
    an output module (350; 450) arranged to output data based on the aggregated signal data.

11. The system (300; 400*a*, 400*b*) according to claim 10, further comprising a storage device (360; 460) arranged store the received signal data and to provide stored signal data to the second computational resource.

12. A non-transitory computer-readable storage medium storing one or more programs to be executed by one or more processors of a system for signal processing resource allocation, the one or more programs comprising computer program code which, when executed, causes the one or more processors to:
    receive (S10; S210) streaming signal data,
    at a first computational resource, determine (S20; S220) a first data subset of the streaming signal data based on a selection criterion, the selection criterion having a contextual relationship with a predetermined scenario,
    determine (S25; S225) a second data subset of the received streaming signal data based on the first data subset and the contextual relationship,
    at a second computational resource, analyze (S30; S230) the second data subset using an algorithm based on the contextual relationship,
    form (S40; S240) aggregated signal data based on the received streaming signal data and the analysed second data subset, and
    output (S50; S250) data based on the aggregated signal data.

13. The non-transitory computer-readable storage medium according to claim 12, wherein the predetermined scenario comprises a radar detection scenario.

14. The non-transitory computer-readable storage medium according to claim 12, wherein the algorithm based on the contextual relationship comprises at least one of:
    a track before detect algorithm,
    a low loss signal processing algorithm,
    a high accuracy position, velocity estimation algorithm, or
    an advanced object feature estimation algorithm.

15. The non-transitory computer-readable storage medium according to claim 12, wherein the first data subset is determined based on an algorithm arranged to require less computational resources than the algorithm used to analyse the second data subset.

16. The non-transitory computer-readable storage medium according to claim 12, wherein the selection criterion comprises an indication of at least one of a signal-to-noise ratio, a model parameter estimation, or a feature estimation.

17. The non-transitory computer-readable storage medium according to claim 12, wherein forming (S40; S240) aggregated signal data comprises updating (S41; S241) previously output data based on the analysed second data subset.

* * * * *